United States Patent
Dietrich et al.

(10) Patent No.: US 12,278,345 B2
(45) Date of Patent: Apr. 15, 2025

(54) ARRANGEMENT FOR PRESSURE MONITORING WITHIN A BATTERY HOUSING, BATTERY MANAGEMENT DEVICE, AND BATTERY SYSTEM WITH AN ARRANGEMENT

(71) Applicant: Vitesco Technologies GmbH, Regensburg (DE)

(72) Inventors: Markus Dietrich, Poing (DE); Gerhard Eser, Hemau (DE); Christian Weber, Sinzing (DE)

(73) Assignee: Vitesco Technologies GmbH, Regensburg (DE)

( * ) Notice: Subject to any disclaimer, the term of this patent is extended or adjusted under 35 U.S.C. 154(b) by 553 days.

(21) Appl. No.: 17/659,332

(22) Filed: Apr. 15, 2022

(65) Prior Publication Data

US 2022/0238927 A1    Jul. 28, 2022

Related U.S. Application Data

(63) Continuation of application No. PCT/EP2020/074601, filed on Sep. 3, 2020.

(30) Foreign Application Priority Data

Oct. 15, 2019 (DE) .................. 10 2019 215 849.8

(51) Int. Cl.
*H01M 10/42* (2006.01)
*H01M 10/48* (2006.01)
*H01M 50/325* (2021.01)

(52) U.S. Cl.
CPC ......... *H01M 10/425* (2013.01); *H01M 10/48* (2013.01); *H01M 50/325* (2021.01);
(Continued)

(58) Field of Classification Search
CPC ............ H01M 10/425; H01M 10/48; H01M 2010/4271; H01M 2200/20
See application file for complete search history.

(56) References Cited

U.S. PATENT DOCUMENTS

| 9,083,064 B2 | 7/2015 | LePort |
| 2014/0186667 A1 | 7/2014 | Lee |

(Continued)

FOREIGN PATENT DOCUMENTS

| CN | 103782468 A | 5/2014 |
| CN | 107406006 A | 11/2017 |

(Continued)

OTHER PUBLICATIONS

International Search Report and Written Opinion dated Nov. 20, 2020 from corresponding International Patent Application No. PCT/EP2020/074601.

(Continued)

*Primary Examiner* — Brian R Ohara
*Assistant Examiner* — Brent C Thomas

(57) ABSTRACT

An arrangement for pressure monitoring within a battery housing of a battery system. The arrangement includes a first power supply path and a pressure measuring. The pressure measuring unit is electrically connected to the first power supply path. The arrangement also includes a pressure-sensitive mechanical switching unit arranged within the battery housing and electrically connected, in series with the pressure measuring unit, to the first power supply path. The switching unit switches to an electrically conductive switching state when the pressure within the battery housing exceeds a predefined pressure threshold and establishes a supply of power to the pressure measuring unit via the first power supply path, and switches to an electrically blocking switching state when the pressure within the battery housing falls below the pressure threshold and interrupts the supply of power to the pressure measuring unit via the first power supply path.

11 Claims, 4 Drawing Sheets

(52) U.S. Cl.
CPC   *H01M 2010/4271* (2013.01); *H01M 2200/20* (2013.01); *H01M 2220/20* (2013.01)

(56)           References Cited

U.S. PATENT DOCUMENTS

| | | |
|---|---|---|
| 2015/0132614 A1 | 5/2015 | Ruhl |
| 2015/0311571 A1 | 10/2015 | Krauss |
| 2018/0026312 A1 | 1/2018 | Hinterberger |
| 2018/0040926 A1 | 2/2018 | Keser et al. |
| 2018/0062150 A1 | 3/2018 | Kim |
| 2019/0047438 A1 | 2/2019 | Jaster |
| 2020/0086745 A1* | 3/2020 | Kim .................. H02J 7/0029 |

FOREIGN PATENT DOCUMENTS

| | | |
|---|---|---|
| DE | 102011089977 A1 | 6/2013 |
| DE | 102012204033 A1 | 9/2013 |
| DE | 102012223480 A1 | 6/2014 |
| DE | 102012223708 A1 | 6/2014 |
| DE | 102014116451 A1 | 5/2015 |
| DE | 102015014610 A1 | 7/2016 |
| EP | 3627615 A1 | 3/2020 |
| JP | 2011009042 A | 1/2011 |

OTHER PUBLICATIONS

German Office Action dated Jun. 4, 2020 for corresponding German Patent Application No. 10 2019 215 849.8.
Chinese Office Action dated Feb. 6, 2024 for corresponding Patent Application No. 202080070884. 1.

* cited by examiner

ARRANGEMENT FOR PRESSURE MONITORING WITHIN A BATTERY HOUSING, BATTERY MANAGEMENT DEVICE, AND BATTERY SYSTEM WITH AN ARRANGEMENT

CROSS-REFERENCE TO RELATED APPLICATIONS

This application claims the benefit of PCT Application PCT/EP2020/074601, filed Sep. 3, 2020, which claims priority to German Application 10 2019 215 849.8, filed Oct. 15, 2019. The disclosures of the above applications are incorporated herein by reference.

TECHNICAL FIELD

The disclosure relates to an arrangement for pressure monitoring within a battery housing of a battery system, such as a traction battery system of an electrically driven vehicle. The disclosure also relates to a battery management device for operating a battery system, such as a traction battery system of an electrically driven vehicle, having a stated arrangement. Furthermore, the disclosure relates to a battery system, such as a traction battery system of an electrically driven vehicle, having a battery management device or a stated arrangement.

BACKGROUND

Lithium-ion battery cells or other battery cells with comparable properties are used, inter alia, in traction battery systems of electrically driven vehicles for the propulsion thereof. Due to their nature, in particular their cell chemistry, battery cells of this kind are susceptible to external influences, such as a high level of heat development. In critical situations, such as in the event of overheating, the battery cells can experience what is known as thermal runaway. In the event of thermal runaway, individual components of the battery cell react in an uncontrolled manner with one another, with a high level of heat development and gas formation, leading to the battery systems catching fire or exploding. In order to avoid this, thermal runaway in the battery cells must be detected at an early stage.

SUMMARY

The disclosure provides a way of determining the state of a battery system, which can be used to reliably detect a critical state, such as thermal runaway, in the battery system or in the battery cells of the battery system.

One aspect of the disclosure provides an (electrical or electromechanical) arrangement for pressure monitoring within a battery housing of a battery system, such as a traction battery system of an electrically driven vehicle, where, in addition to the battery housing, the battery system also includes a number of battery cells arranged within the battery housing.

The arrangement includes a first power supply path and a pressure measuring unit for measuring a pressure within the battery housing. The pressure measuring unit is electrically connected to the first power supply path for the purposes of a supply of power (by the battery system or the battery cells thereof).

The arrangement further includes a pressure-sensitive mechanical, such as electromechanical, switching unit, which is arranged within the battery housing and is electrically connected, in series with the pressure measuring unit, to the first power supply path via two electrical terminals.

The switching unit is set up to switch to an electrically conductive switching state when the pressure within the battery housing exceeds a predefined pressure threshold and thus to establish a supply of power (by the battery system or the battery cells thereof) to the pressure measuring unit via the first power supply path, and to switch to an electrically blocking switching state when the pressure within the battery housing falls below the pressure threshold and thus to interrupt the supply of power to the pressure measuring unit via the first power supply path.

The disclosure makes use of the gas formation in the interior of the battery housing of the battery system, which typically occurs as a result of a critical state, such as thermal runaway, in the battery cells, to detect the critical state or the thermal runaway in the battery cells or the battery system at an early stage. The (air or gas) pressure in the interior of the battery housing or the change therein, which is directly related to the gas formation, is used to monitor the critical state. To monitor the critical state, the (air or gas) pressure in the interior of the battery housing is therefore continuously recorded, and a critical state in the battery cells or the battery system is diagnosed if the recorded pressure deviates from a predefined pressure setpoint range or if the recorded pressure exceeds a predefined pressure threshold. The pressure is monitored by the pressure measuring unit, which is supplied with power from the battery system via the first power supply path.

The pressure-sensitive mechanical switching unit is able to change its switching state independently of the pressure measuring unit, autonomously and in a manner influenced exclusively by the pressure prevailing in the interior of the battery housing. The switching unit can, for example, be in the form of a pressure-sensitive mechanical switch, for example having a strain gauge, which is set up to change its size, shape or other comparable physical (mechanical) property when there is a change in an (air or gas) pressure acting on it, and thus to switch autonomously, independently of the pressure measuring unit, between an electrically conductive switching state and an electrically blocking switching state. The switching unit is designed in such a way that it switches to the electrically conductive switching state at a pressure starting from the predefined pressure threshold and switches to the electrically blocking switching state at a pressure below the pressure threshold.

The pressure threshold is a pressure value that can be determined in advance, the exceeding of which by a pressure in the interior of the battery housing suggests a critical state or an imminent critical state, such as thermal runaway or imminent thermal runaway, in the battery cells or the battery system. The pressure threshold is selected in such a way that a (possible imminent) critical state, such as a (possible imminent) thermal runaway, and an associated increase in pressure in the interior of the battery housing can be detected at an early stage/in good time.

In the electrically conductive switching state, the switching unit, which is electrically connected in series with the pressure measuring unit in the power supply path, establishes a supply of power for the pressure measuring unit. Supplied with power, the pressure measuring unit can measure the pressure in the interior of the battery housing with a required high level of accuracy and forward the measured pressure values to a downstream battery management arrangement for a more accurate analysis, the battery management arrangement comparing the measured pressure values with a critical pressure threshold value, for example, and, based on the comparison result, providing a more accurate statement about a critical state and, if necessary, taking further necessary steps, such as outputting a warning signal, etc.

The power is typically supplied by the battery cells of the battery system to which the arrangement is also (directly or indirectly) electrically connected.

As a pressure-sensitive mechanical switching unit, the switching unit itself does not consume any power and does not subject the battery system to loading, such as during the inactive phases (idle mode) thereof, and thus preserves the battery system and consequently also protects the battery system from deep discharge.

By virtue of the fact that the switching unit interrupts the supply of power (by the battery system) to the pressure measuring unit in the time phase in which the pressure in the interior of the battery housing falls below the predefined pressure threshold and there is therefore no risk of a critical state in the battery system, the switching unit avoids (unnecessary) power consumption by the pressure measuring unit and further preserves the battery system.

As soon as the pressure in the interior of the battery housing exceeds the predefined pressure threshold, the switching unit, by changing its size, shape or other comparable physical (mechanical) property, establishes the supply of power for the pressure measuring unit via the first power supply path, such that the pressure measuring unit can from then on measure the pressure in the interior of the battery housing more accurately, and the abovementioned battery management arrangement can use these more accurate measured values to make an accurate reliable statement about a critical state and take further necessary steps such as, for example, outputting a warning signal, etc.

In summary, the pressure measuring unit, for example during the inactive phases of the battery system, is activated only in an event-controlled manner, where this activation is controlled by the pressure-sensitive mechanical switching unit, which is connected upstream of the pressure measuring unit and also acts autonomously, independently of the pressure measuring unit or any other control unit, and responds, without any internal power consumption, exclusively to a change in pressure, such as an increase in pressure, in the interior of the battery housing.

This provides a way of determining the state of a battery system, which can be used to reliably detect a critical state, such as thermal runaway, in the battery system or in the battery cells of the battery system.

For example, the arrangement is furthermore designed to be operable in an idle mode in which the arrangement interrupts the supply of power for the pressure measuring unit, such that the pressure measuring unit does not receive any energy for performing its functions, including for measuring the pressure within the battery housing. In this idle mode, the pressure measuring unit does not measure the pressure. The switching unit is furthermore set up to switch to the electrically conductive switching state in the idle mode of the arrangement and when the pressure within the battery housing exceeds the predefined pressure threshold, and thus to establish a supply of power (by the battery system or the battery cells thereof) to the pressure measuring unit via the first power supply path, and to switch to the electrically blocking switching state in the idle mode of the arrangement and when the pressure within the battery housing falls below the pressure threshold, and thus to interrupt the supply of power to the pressure measuring unit via the first power supply path.

For example, the abovementioned pressure threshold is below a critical pressure threshold value. The critical pressure threshold value is a pressure value which, when exceeded (by the (air or gas) pressure within the battery housing), means that a critical or faulty state, such as thermal runaway, is present in the battery system or in the battery cells, or at least that it is suggested that a critical or faulty state is present in the battery system or in the battery cells.

For example, the pressure measuring unit includes a pressure sensor having a pressure-sensitive microelectromechanical element (microelectromechanical system (MEMS)), the microelectromechanical element being formed as part of the switching unit. The microelectromechanical element is set up to electrically short the two terminals of the switching unit to one another when the pressure within the battery housing exceeds the pressure threshold and thus to establish a supply of power to the pressure measuring unit via the first power supply path, and to electrically disconnect the two terminals from one another when the pressure within the battery housing falls below the pressure threshold and thus to interrupt the supply of power to the pressure measuring unit via the first power supply path.

For example, the arrangement includes a pressure equalization valve for equalizing the air pressure within the battery housing, which pressure equalization valve in turn includes a membrane that is reversibly movable or reversibly/elastically deformable under the action of pressure. The membrane is formed as part of the switching unit and is set up so as, by way of a movement caused by the (increasing) action of pressure or by way of a deformation caused by the (increasing) action of pressure, to electrically short the two terminals of the switching unit to one another when the pressure within the battery housing exceeds the pressure threshold, and thus to establish a supply of power to the pressure measuring unit via the first power supply path, and so as, by way of a reversible movement or a reversible deformation, to electrically disconnect the two terminals from one another when the pressure within the battery housing falls below the pressure threshold, and thus to interrupt the supply of power to the pressure measuring unit via the first power supply path. The membrane is provided with an electrically conductive material.

The pressure-sensitive membrane of the pressure equalization valve, which acts primarily to equalize the air pressure, is used for pressure monitoring. When the membrane is subjected to excess pressure (equal to or higher than the pressure threshold) within the battery housing, the membrane deforms (stretches) or moves. As a result of the deformation or movement, the membrane touches the two terminals of the switching unit with its electrically conductive material and thus electrically connects them to one another.

For example, the arrangement further includes an air or gas flow channel, which is fluidically connected to the abovementioned pressure equalization valve and is set up (for example, in the case of excess pressure within the battery housing) to discharge air or gases from the interior of the battery housing into the surroundings of the battery housing. Furthermore, the arrangement includes, for example, an air mass sensor, which is arranged in the air flow channel, is connected on the signal output side, for signaling purposes, to a measurement signal input of a (or the abovementioned) measured value evaluation circuit of the pressure measuring unit and is set up (for example, when the pressure within the battery housing exceeds the pressure threshold) to measure a mass flow of the gases/air flowing out of the battery housing via the air flow channel and to forward measured values to the measured value evaluation circuit. The measured value evaluation circuit is furthermore set up, for example, to ascertain the pressure within the battery housing (inter alia) based on the measured values transmitted by the air mass sensor.

For example, the arrangement further includes a second power supply path, which is embodied parallel to the first power supply path. Furthermore, the arrangement also includes a controllable switch, which is electrically connected in the second power supply path. The pressure measuring unit is furthermore electrically connected, in series with the switch, to the second power supply path for power supply purposes. The switch is designed to be switchable between a closed, conductive switching state, in which it establishes a supply of power (by the battery system or the battery cells thereof) to the pressure measuring unit via the second power supply path, and an open, blocking switching state, in which it interrupts the supply of power to the pressure measuring unit via the second power supply path.

In some examples, the switch is set up so that it can be controlled by the abovementioned battery management arrangement. The battery management arrangement is set up to interrupt the supply of power for the pressure measuring unit via the second power supply path in the abovementioned idle mode by opening the switch. In addition, the arrangement is set up so as to be operable in an active operating mode, where in the active operating mode the battery management arrangement establishes the supply of power (by the battery system or the battery cells thereof) for the pressure measuring unit via the second current path by closing the switch, such that the pressure measuring unit receives power (from the battery system or the battery cells thereof) for performing its functions, including for measuring the pressure within the battery housing, via the second current path. In this operating mode, the pressure measuring unit measures the pressure within the battery housing.

Another aspect of the disclosure provides a battery management device for operating a battery system, for example, a traction battery system of an electrically driven vehicle. The system includes a battery housing and a number of battery cells arranged within the battery housing.

The battery management device includes an arrangement described above and an abovementioned battery management arrangement for operating the battery system. The pressure measuring unit of the arrangement is connected on the signal output side, for signaling purposes, to the battery management arrangement (or to a signal input of the battery management arrangement) and is furthermore set up to forward measured values of the pressure within the battery housing to the battery management arrangement. The battery management arrangement is furthermore set up to use the transmitted measured values (inter alia) to detect an (imminent) critical state, such as (imminent) thermal runaway, in the battery system or in the battery cells.

For example, the battery management arrangement is furthermore connected, for signaling purposes, to a control signal terminal of the switch via a control signal output and is set up to open the switch in the idle mode of the arrangement and thus to interrupt the supply of power for the pressure measuring unit via the second power supply path, and to close the switch in the active operating mode and thus to establish the supply of power for the pressure measuring unit via the second power supply path.

For example, the battery management arrangement is electrically connected, in series with the switching unit and the pressure measuring unit, to the first power supply path. The switching unit is furthermore set up to also establish a supply of power to the battery management arrangement (as well as the pressure measuring unit) via the first power supply path in the electrically conductive switching state, and to interrupt the supply of power to the battery management arrangement via the first power supply path in the electrically blocking switching state. In this case, the switching unit can control the supply of power both to the pressure measuring unit and to the entire battery management arrangement via the first power supply path autonomously and without internal power consumption, exclusively on the basis of a change in pressure, such as an increase in pressure, in the interior of the battery housing.

Yet another aspect of the disclosure provides a battery system, such as a traction battery system of an electrically driven vehicle.

The battery system includes a battery housing and a number of battery cells arranged within the battery housing. The battery system further includes a battery management device, described above, for operating the battery system, wherein the battery management arrangement is furthermore set up to use the arrangement described above to monitor pressure within a battery housing of the battery system and, based on this, to detect, inter alia, a critical state, such as thermal runaway, in the battery system or the battery cells.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
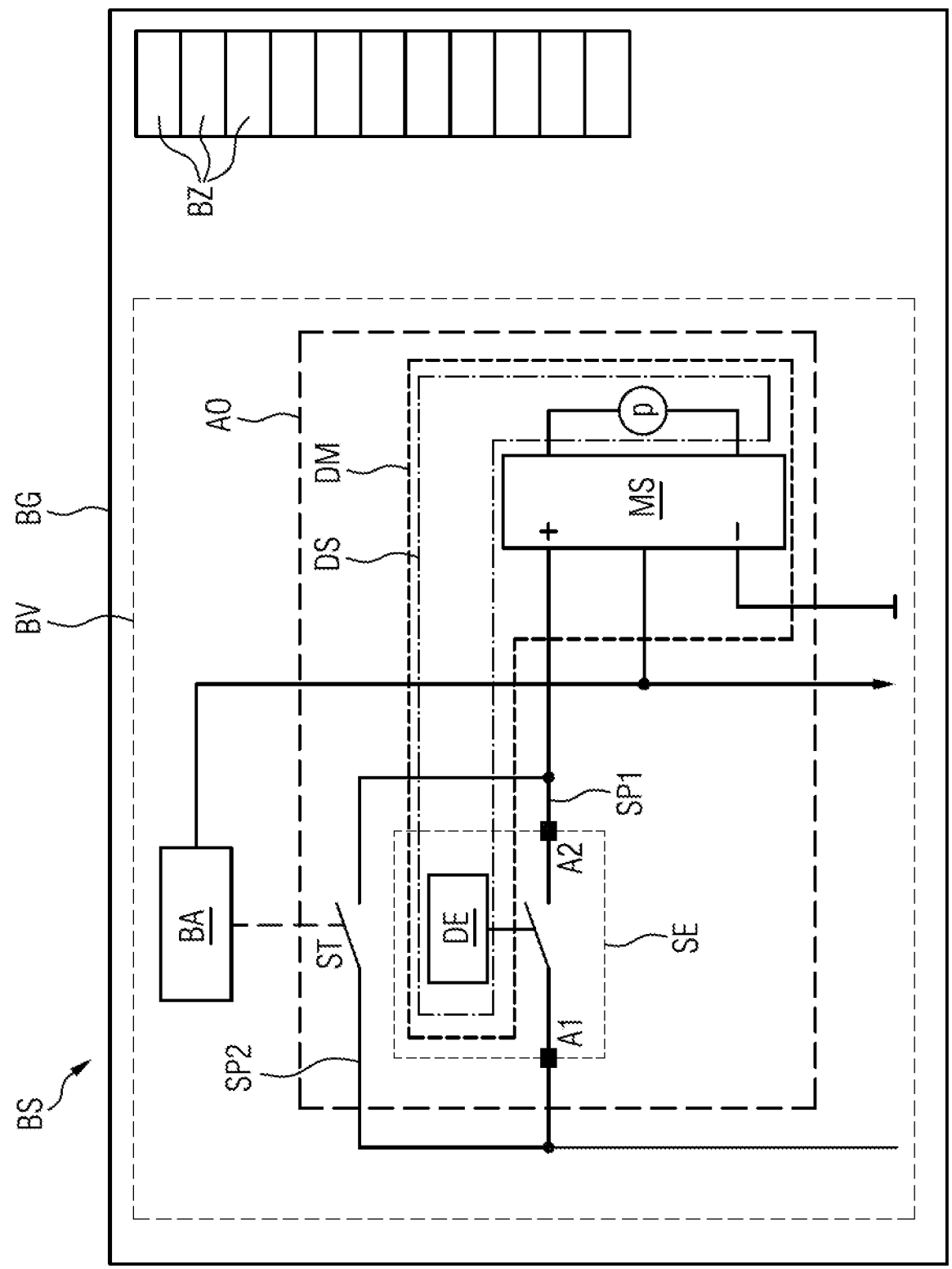
FIG. 1 shows, in a first schematic illustration, an exemplary battery system (or part thereof) with part of a battery management device.

FIG. 1 shows, in a schematic illustration, an exemplary battery system BS (or part thereof) with a battery management device BV (or part thereof, respectively).

As shown, the battery system BS is in the form of a traction battery system of an electrically driven vehicle. The battery system BS includes a battery housing BG and a plurality of battery cells BZ. The battery cells BZ are arranged in the battery housing BG and are also protected from mechanical and other external influences by the battery housing BG. Lithium-ion battery cells, for example in the form of pouch cells, are installed as battery cells BZ.

The battery housing BG has openings OF in the housing wall (cf. FIGS. 2 and 3), through which openings air or gas can flow between the interior of the battery housing BG and the surroundings of the battery housing BG. The air or gas pressure in the interior of the battery housing BG is adjusted to the air pressure in the surroundings of the battery housing BG by way of the openings OF.

The battery management device BV is also arranged in the battery housing BG and serves to ascertain or monitor the state of the battery system BS and to operate the battery system BS according to the ascertained state and based on the requirements of a superordinate central control device of the vehicle. The battery management device BV operates the battery system BS or the battery cells BZ of the battery system BS in such a way that the battery cells BZ are operated in a manner that preserves them to the greatest possible extent, such that they are protected against overcharging or deep discharging. For this purpose, the battery management device BV includes a battery management arrangement BA, which includes, inter alia, controllable switches or DC-to-DC converters controllable in open-loop or closed-loop fashion, which are each connected upstream of one of the battery cells BZ and are associated with the respective battery cells BZ. The battery management arrangement BA is set up so as, based on the ascertained states of the respective corresponding battery cells BZ, and on the request of the battery management device BV, to control the associated switches or DC-to-DC converters of the respective battery cells BZ in open-loop or closed-loop fashion such that the battery cells BZ are operated in a manner that preserves them and are protected against failure.

Despite the protective battery housing BG, the battery cells BZ are exposed to many external influences, such as high ambient temperatures or strong temperature fluctuations or strong mechanical vibrations, for example due to the application in vehicles, which influences impair the functionality of the battery cells BZ and can even lead to premature failure of the battery cells BZ.

In addition, like almost all technical components, the battery cells BZ are subject to an unavoidable aging process which, in addition to the influences mentioned above, impairs the functionality of the battery cells BZ and can lead to premature failure of the battery cells BZ.

Moreover, battery cells BZ inherently have various potential hazards due to their nature and material composition. One of the potential hazards arising from battery cells BZ such as lithium-ion battery cells is what is known as thermal runaway. Due to their chemical composition, the battery cells BZ can, in certain situations, such as in the case of mechanical damage or an electrical short circuit, overheat uncontrollably, which in turn can lead to the entire battery system BS catching fire or exploding.

To be able to monitor the functionality of the battery cells BZ and thus of the battery system BS and detect an imminent failure of the battery cells BZ and dangers such as (imminent) thermal runaway through the battery cells BZ as early as possible and to be able to take suitable measures, the battery management device BV includes an arrangement AO for monitoring the (air or gas) pressure within the battery housing BG of the battery system BS.

The arrangement AO includes a pressure measuring unit DM for measuring the pressure within the battery housing BG and a pressure-sensitive mechanical switching unit SE. Furthermore, the arrangement AO includes a first power supply path SP1, which electrically connects the pressure measuring unit DM to a group of selected battery cells BZ that are electrically connected in series with one another for the purposes of supplying power to the pressure measuring unit DM. These selected battery cells BZ provide a nominal voltage of, for example, 5 or 12 volts required for operating the pressure measuring unit DM. In this first power supply path SP1, the pressure measuring unit DM and the switching unit SE are electrically connected to one another in series.

The pressure measuring unit DM and the switching unit SE are furthermore arranged within the battery housing BG.

The switching unit SE further includes two electrical terminals A1, A2 and is electrically connected, in series with the pressure measuring unit DM, to the first power supply path SP1 via these two terminals A1, A2.

The pressure measuring unit DM includes a pressure sensor DS having a pressure-sensitive microelectromechanical element DE, where the microelectromechanical element DE is formed as part of the switching unit SE. The pressure measuring unit DM further includes a measured value evaluation circuit MS, which, for signaling purposes, is connected to a signal output of the pressure sensor DS on the signal input side and is connected to a signal input of the battery management arrangement BA on the signal output side.

The arrangement AO further includes a second power supply path SP2, which is embodied parallel to the first power supply path SP1 and thus electrically connects the pressure measuring unit DM to the abovementioned battery cell group. The arrangement AO further includes a controllable switch ST in the form of a semiconductor switch, for example, which is electrically connected in series with the pressure measuring unit DM in the second power supply path SP2. The switch ST is designed to be switchable between a closed, conductive switching state, in which it establishes a supply of power to the pressure measuring unit DM via the second power supply path SP2, and an open, blocking switching state, in which it interrupts the supply of power to the pressure measuring unit DM via the second power supply path SP2. If necessary, the pressure measuring unit DM can thus also be supplied with power via the second power supply path SP2 instead of via the first power supply path SP1. The switch ST is controlled by the battery management arrangement BA, which is connected, for signaling purposes, to a control terminal of the switch ST via a control signal connection.

The structure of the battery management device BV, such as the arrangement AO for pressure monitoring, having been described in detail with reference to FIG. 1, its method of operation will be described in more detail below.

The battery system BS and thus also the battery management device BV together with the arrangement AO are designed to be operable in an active operating mode and in an idle mode.

In an active operating mode, the battery system BS provides a "large" amount of power, for example for driving the vehicle or for performing, for example, vehicle comfort-related functions of the vehicle, for example for operating an auxiliary heater or a navigation device of the vehicle, or is connected to a charging station and charged, or is charged by recuperation with braking energy of the vehicle.

In this operating mode of the battery system BS, the battery management device BV is also in the operating mode and controls the battery system BS and regulates the current flow from or to the individual battery cells BZ of the battery system BS. In addition, the battery management device BV or the battery management arrangement BA controls the arrangement AO or its pressure measuring unit DM, such that the latter measures, continuously and at regular short time intervals of, for example, several to several tens of milliseconds, the air/gas pressure in the interior of the battery housing BG and forwards the measured values (for example in unprocessed form) directly to the battery management arrangement BA. The battery management arrangement BA evaluates the transmitted measured values in a manner known to those skilled in the art (for example by comparing them with a predefined critical pressure threshold value) and analyzes the state of the battery system BS based on this. Furthermore, based on the analysis results, the battery management arrangement BA detects, inter alia, whether a critical state, such as an overpressure in the interior of the battery housing BG as a result of thermal runaway, is present. If a critical state is detected, the battery management arrangement BA issues a warning signal to the battery management device BV and thus prompts the battery management device BV to switch off the entire battery system BS and/or to take further suitable measures.

In this operating mode, the battery management arrangement BA switches on the switch ST and thus establishes a supply of power for the pressure measuring unit DM via the second power supply path SP2. Via this second power supply path SP2, the pressure measuring unit DM draws power for its functions from the abovementioned battery cell group and thus subjects this battery cell group to loading.

As long as the air/gas pressure in the interior of the battery housing BG is below a predefined pressure threshold (which is lower than the abovementioned critical pressure threshold value), the switching unit SE remains in an electrically blocking switching state.

If the air pressure in the interior of the battery housing BG exceeds the abovementioned critical pressure threshold value, for example as a result of thermal runaway in one or other of the battery cells BZ, the battery management arrangement BA detects the presence of thermal runaway by comparing the measured pressure values measured and transmitted by the pressure measuring unit DM with the stated critical pressure threshold value, and issues the warning signal.

In an idle mode, the vehicle is parked. In the idle mode, power, or a "large" amount of power, is neither drawn from the battery system BS, nor supplied to the battery system BS. In this idle mode A, only safety-related functions of the vehicle, such as an anti-theft function, are executed.

Most functions, such as those that are not safety-related, are shut down in the battery management device BV. Accordingly, the pressure measuring unit DM is placed in idle mode, in which it no longer measures air/gas pressure. For this purpose, the battery management arrangement BA switches off the switch ST and thus interrupts the supply of power for the pressure measuring unit DM via the second power supply path SP2.

The battery management arrangement BA may still be kept in the operating mode in which it continues to perform safety-related functions.

In this idle mode, the monitoring of the state or pressure in the battery system BS is performed (exclusively) without power consumption and autonomously by the switching unit SE with its pressure-sensitive microelectromechanical element DE. The pressure-sensitive element DE is set in such a way that it moves, deforms or changes its electromechanical property in some other comparable way when the air/gas pressure acts on it. If the air/gas pressure in the interior of the battery housing BS exceeds the predetermined pressure threshold, the element DE moves or deforms or changes its electromechanical property in such a way that it electrically shorts the two terminals A1, A2 of the switching unit SE to one another. As a result, the supply of power by the abovementioned battery cell group for the pressure measuring unit DM via the first power supply path SP1 is established. Supplied with power, the pressure measuring unit DM carries out a more accurate measurement of the air/gas pressure in the interior of the battery housing BG and forwards the measured values to the battery management arrangement BA. When the battery management arrangement BA receives the measured values from the pressure measuring unit DM, the battery management arrangement checks, for example by comparing the measured values with the predefined critical pressure threshold value, whether a critical state, such as thermal runaway, is in fact present in the battery system BS.

As long as the air/gas pressure in the interior of the battery housing BG is below the abovementioned pressure threshold of the pressure-sensitive element DE, the form, position or electromechanical property thereof remains such that it does not electrically short the two terminals A1, A2 of the switching unit SE to each other. Accordingly, the first power supply path SP1 remains open and the pressure measuring unit DM does not receive any power via the first power supply path SP1.

In some implementations, the battery management arrangement BA is electrically connected, in series with the switching unit SE and the pressure measuring unit DM, to the first power supply path SP1. In this case, the switching unit SE is set up to establish a supply of power to the battery management arrangement BA via the first power supply path SP1 in the electrically conductive switching state and to interrupt the supply of power to the battery management arrangement BA via the first power supply path SP1 in the electrically blocking switching state. Accordingly, the battery management arrangement BA is also placed in idle mode in an idle mode of the battery system BS and is only activated into the operating mode when the switching unit SE or its pressure-sensitive element DE records an overpressure or an air/gas pressure higher than the pressure threshold in the interior of the battery housing BG or establishes the supply of power via the first power supply path SP1.

Figure 2:
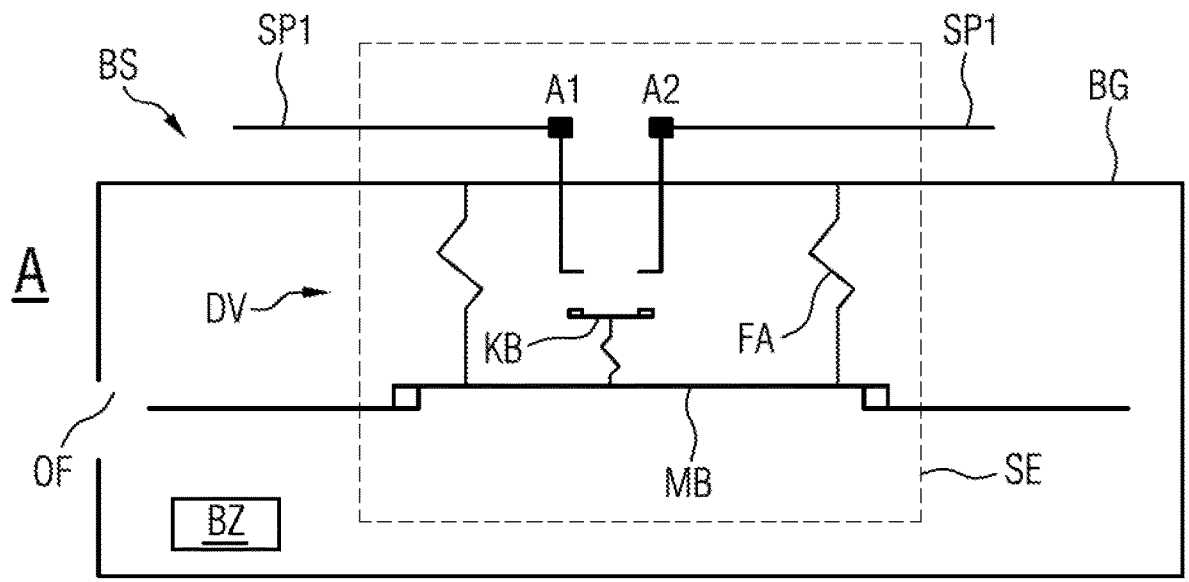
FIG. 2 shows, in a second schematic illustration, part of an exemplary battery management device from FIG. 1.
Figure 2:
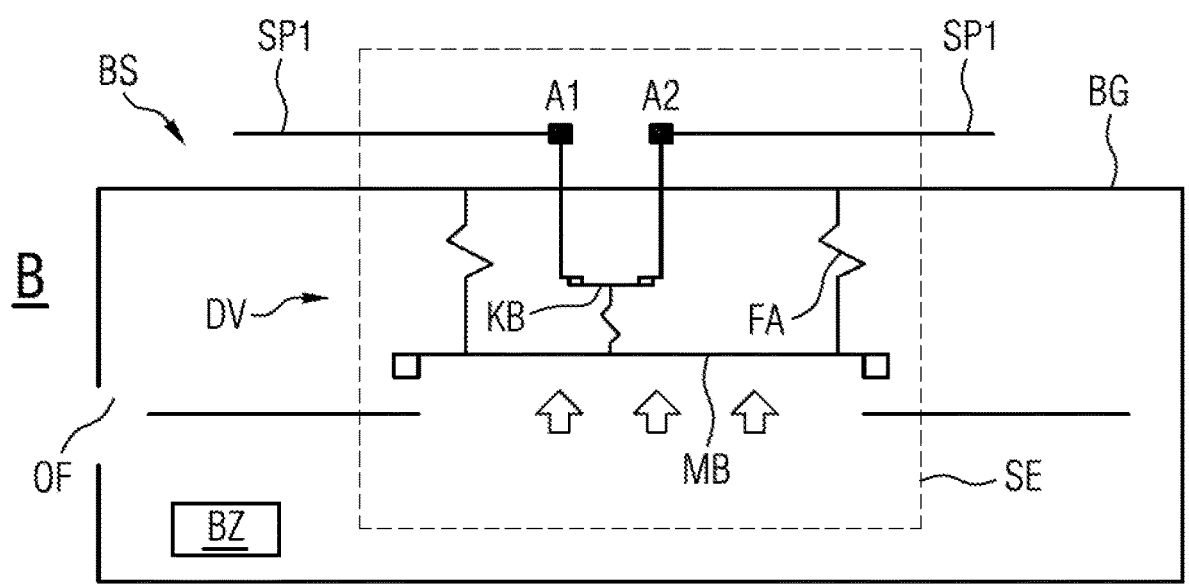

In a second schematic illustration, FIG. 2 shows part of a battery management device BV from FIG. 1.

As shown in FIG. 2, the arrangement AO of the battery management device BV includes a pressure equalization valve DV, which is arranged at the abovementioned opening OF of the battery housing BG and is set up to discharge gases from the battery housing into the surroundings of the battery housing in the event of overpressure in the interior of the battery housing BG. The pressure equalization valve DV includes a membrane MB that is designed to be reversibly movable or reversibly/elastically deformable under the action of pressure. By way of the movement or deformation, the membrane MB opens the pressure equalization valve DV, as a result of which the gases are discharged from the battery housing into the surroundings of the battery housing. The membrane MB is formed as part of the switching unit SE and is held resiliently on a housing wall in the region of the abovementioned opening OF via two or more spring arms FA. The spring arms FA hold the membrane MB in a closing position, in which the membrane MB closes the opening OF and thus interrupts an air/gas flow between the interior of the battery housing BG and the surroundings of the battery housing BG (as illustrated in section A of FIG. 2). In the event of overpressure in the interior of the battery housing BG, the membrane MB is pushed by the compressive force of the overpressure in the interior of the battery housing BG (which is greater than the spring force of the spring arms FA) into an opening position, in which it opens the opening OF and thus allows air/gas to flow from the interior of the battery housing BG into the surroundings of the battery housing BG (as illustrated by arrows in section B of FIG. 2).

The membrane MB further includes a thin copper sheet KB, which touches the two terminals A1, A2 of the switching unit SE and thus electrically shorts the two terminals A1, A2 to one another when the membrane MB is in an opening position (when the pressure in the interior of the battery housing BG exceeds the pressure threshold), as a result of which the supply of power for the pressure measuring unit DM via the first power supply path SP1 is established (as illustrated in section B of FIG. 2). In the closed position of the membrane MB (when the pressure in the interior of the battery housing BG falls below the pressure threshold), the spring elements FA of the membrane MB lead the copper sheet KB away from the two terminals A1, A2, such that the electrical connection via the two terminals A1, A2 and thus also the supply of power for the pressure measuring unit DM via the first power supply path SP1 are interrupted (as illustrated in section A of FIG. 2).

Figure 3:
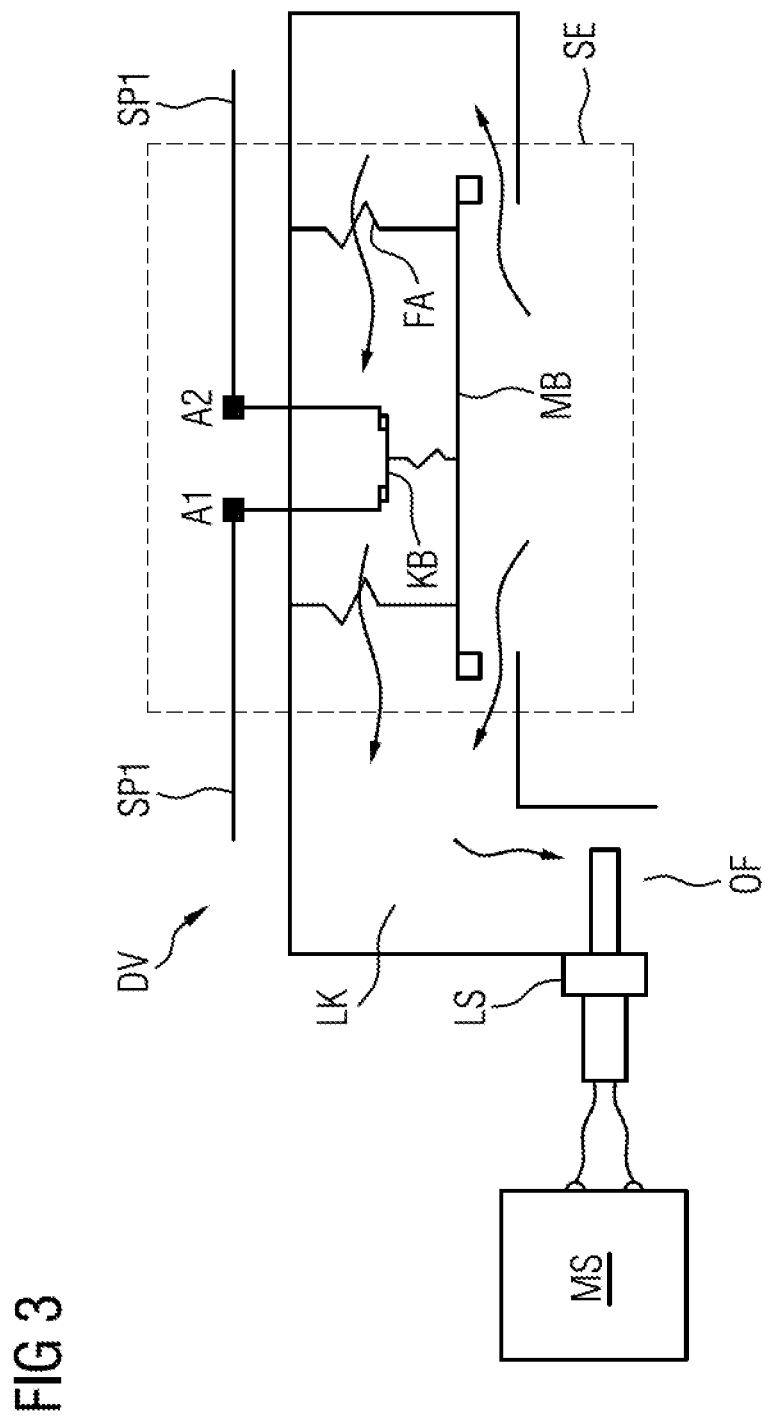
FIG. 3 shows, in a third schematic illustration, part of an exemplary battery management device from FIG. 1.

FIG. 3 shows a further example of the arrangement AO illustrated in FIG. 2.

In addition to the pressure equalization valve DV, the arrangement AO in FIG. 3 also includes an air flow channel LK for discharging gases from the battery housing BG into the surroundings of the battery housing BG, which air flow channel is fluidically connected to the pressure equalization valve DV. Furthermore, the arrangement AO also includes an air mass sensor LS, which is arranged in the air flow channel LK. The air mass sensor LS is connected, for signaling purposes, on the signal output side to a measuring signal input of a measured value evaluation circuit MS of the pressure measuring unit DM and is set up to measure a mass flow of the gases flowing out of the battery housing BG via the air flow channel LK (as illustrated by arrows in section B of FIG. 3) and to forward measured values to the measured value evaluation circuit MS. In this case, the measured value evaluation circuit MS is furthermore set up to ascertain the exact air/gas pressure in the interior of the battery housing BG based on the measured mass flow values transmitted by the air mass sensor LS and the measured pressure values transmitted by the pressure measuring unit DM.

Figure 4:
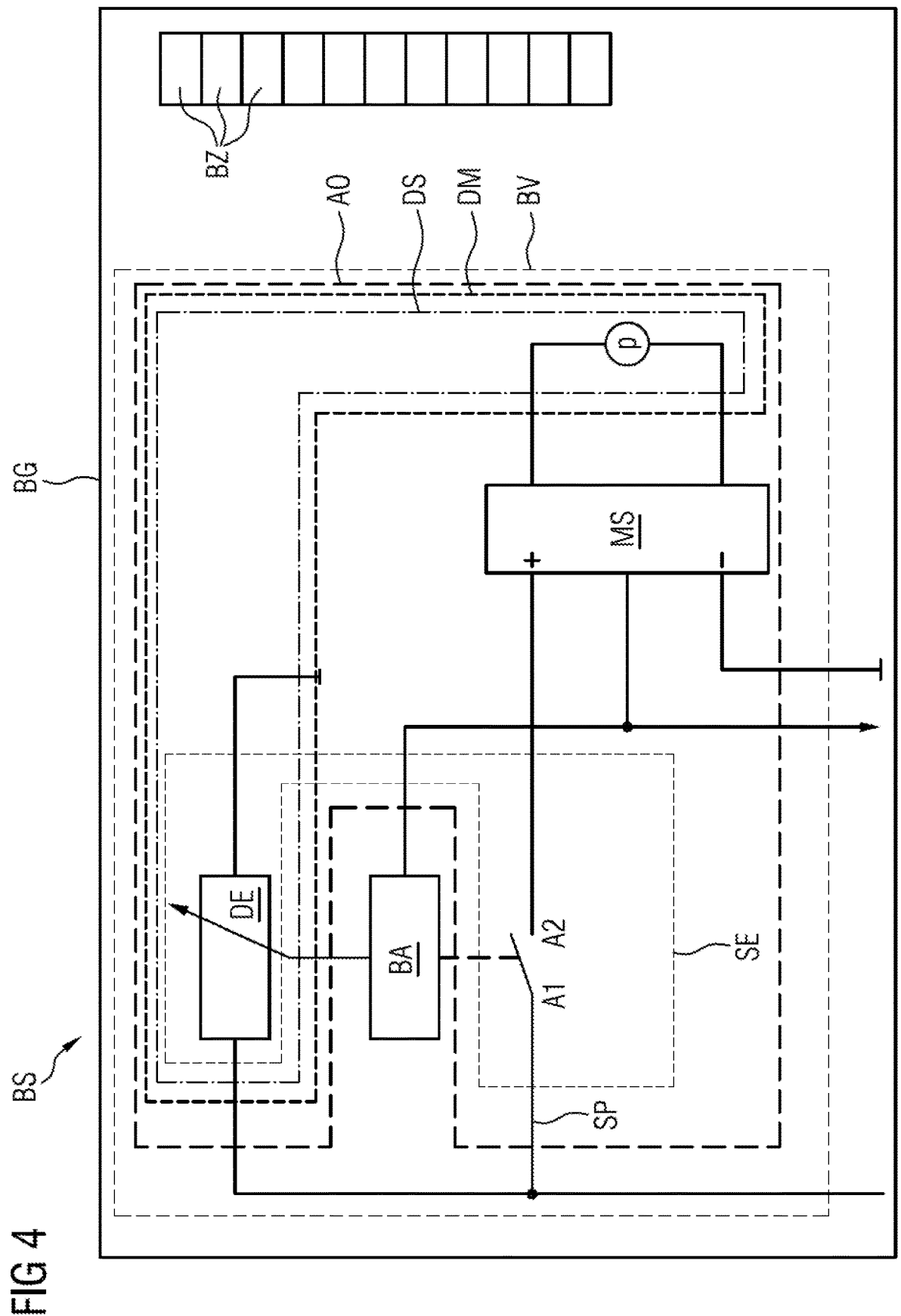
FIG. 4 shows, in a fourth schematic illustration, an exemplary battery system (or part thereof) with part of a battery management device.

FIG. 4 shows a battery system BS (or part thereof) with part of a battery management device BV according to another example.

The battery management device BV illustrated in FIG. 4 differs from the battery management device BV illustrated in FIG. 1 in that the pressure-sensitive microelectromechanical element DE of the switching unit SE is designed such that when the pressure in the interior of the battery housing BG exceeds the pressure threshold, the switching unit directly wakes the battery management arrangement BA from idle mode into the active operating mode, said battery management arrangement BA previously also transitioning into idle mode in the idle mode of the battery system BS. Once woken into the operating mode, the battery management arrangement BA controls the switching unit SE in such a way that the latter electrically connects the two terminals A1, A2 to one another and thus establishes the supply of power for the pressure measuring unit DM via the first power supply path SP1.

A number of implementations have been described. Nevertheless, it will be understood that various modifications may be made without departing from the spirit and scope of the disclosure. Accordingly, other implementations are within the scope of the following claims.

What is claimed is:

1. An arrangement for pressure monitoring within a battery housing of a battery system, the arrangement comprising:
   a first power supply path;
   a pressure measuring unit for measuring a pressure within the battery housing, the pressure measuring unit is electrically connected to the first power supply path for power supply purposes; and
   a pressure-sensitive mechanical switching unit is arranged within the battery housing and is electrically connected, in series with the pressure measuring unit, to the first power supply path via two electrical terminals, wherein:
      the pressure-sensitive mechanical switching unit switches to an electrically conductive switching state when the pressure within the battery housing exceeds a predefined pressure threshold establishing a supply of power to the pressure measuring unit via the first power supply path, and
      the pressure-sensitive mechanical switching unit switches to an electrically blocking switching state when the pressure within the battery housing falls below the pressure threshold interrupting the supply of power to the pressure measuring unit via the first power supply path.

2. The arrangement of claim 1, wherein in an idle mode operation, the supply of power for the pressure measuring unit is interrupted and the pressure measuring unit does not measure the pressure; and
   wherein the switching unit is furthermore set up to:
      switch to the electrically conductive switching state in the idle mode of the arrangement and when the pressure within the battery housing exceeds the predefined pressure threshold, and
      switch to the electrically blocking switching state in the idle mode of the arrangement and when the pressure within the battery housing falls below the pressure threshold.

3. The arrangement of claim 1, wherein the pressure threshold is below a critical pressure threshold value, wherein the battery system is in a critical state when the pressure within the battery housing exceeds this critical pressure threshold value.

4. The arrangement of claim 1, wherein the pressure measuring unit comprises a pressure sensor having a pressure-sensitive microelectromechanical element, the microelectromechanical element is formed as part of the switching unit and is set up to electrically short the two terminals to one another when the pressure within the battery housing exceeds the pressure threshold, and to electrically disconnect the two terminals from one another when the pressure within the battery housing falls below the pressure threshold.

5. The arrangement of claim 1, further comprising:
   a pressure equalization valve for discharging gases from the battery housing, the pressure equalization valve including a membrane that is reversibly movable or deformable under pressure, the membrane is formed as part of the switching unit and is set up so as, by way of a movement caused by pressure or by way of a deformation caused by pressure, to electrically short the two terminals of the switching unit to one another when the pressure within the battery housing exceeds the pressure threshold, and so as to electrically disconnect the two terminals from one another when the pressure within the battery housing falls below the pressure threshold.

6. The arrangement of claim 5, further comprising:

an air flow channel for discharging gases from the battery housing into surroundings of the battery housing, the air flow channel is fluidically connected to the pressure equalization valve; and an air mass sensor arranged in the air flow channel, the air mass sensor is connected on a signal output side to a measurement signal input of a measured value evaluation circuit of the pressure measuring unit, the air mass sensor measures a mass flow of the gases flowing out of the battery housing via the air flow channel and forwards measured values to the measured value evaluation circuit;

wherein the measured value evaluation circuit ascertains the pressure within the battery housing based on the measured values transmitted by the air mass sensor.

7. The arrangement of claim 1, further comprising:

a second power supply path parallel to the first power supply path;

a controllable switch electrically connected in the second power supply path;

wherein the pressure measuring unit is electrically connected, in series with the switch, to the second power supply path for supplying power;

wherein the switch is designed to be switchable between a closed, conductive switching state, in which it establishes a supply of power to the pressure measuring unit via the second power supply path, and an open, blocking switching state, in which it interrupts the supply of power to the pressure measuring unit via the second power supply path.

8. A battery management device for operating a battery system having a battery housing and a number of battery cells arranged within the battery housing, the battery management device comprising:

an arrangement for pressure monitoring within a battery housing of a battery system, the arrangement comprising:

a first power supply path;

a pressure measuring unit for measuring a pressure within the battery housing, the pressure measuring unit is electrically connected to the first power supply path for power supply purposes; and a pressure-sensitive mechanical switching unit is arranged within the battery housing and is electrically connected, in series with the pressure measuring unit, to the first power supply path via two electrical terminals, wherein:

the pressure-sensitive mechanical switching unit switches to an electrically conductive switching state when the pressure within the battery housing exceeds a predefined pressure threshold establishing a supply of power to the pressure measuring unit via the first power supply path, and the pressure-sensitive mechanical switching unit switches to an electrically blocking switching state when the pressure within the battery housing falls below the pressure threshold interrupting the supply of power to the pressure measuring unit via the first power supply path; and a battery management arrangement for operating the battery system;

wherein the pressure measuring unit is connected on a signal output side, for signaling purposes, to the battery management arrangement and is furthermore set up to forward measured values of the pressure within the battery housing to the battery management arrangement;

wherein the battery management arrangement is furthermore set up to use the transmitted measured values to detect a critical state in the battery system.

9. The battery management device as of claim 8, wherein the battery management arrangement is connected to a control signal terminal of the switch via a control signal output and is set up to open the switch in idle mode and to interrupt the supply of power for the pressure measuring unit via a second power supply path.

10. The battery management device of claim 8, wherein the battery management arrangement is electrically connected, in series with the switching unit and the pressure measuring unit, to the first power supply path;

wherein the switching unit is furthermore set up to establish a supply of power to the battery management arrangement via the first power supply path in the electrically conductive switching state, and to interrupt the supply of power to the battery management arrangement via the first power supply path in the electrically blocking switching state.

11. A battery system comprising:

a battery housing and a number of battery cells arranged within the battery housing;

a battery management device for operating the battery system; and a battery management arrangement set up to use an arrangement to monitor pressure within a battery housing of the battery system, the arrangement configured for pressure monitoring within the battery housing, the arrangement comprising:

a first power supply path;

a pressure measuring unit for measuring a pressure within the battery housing, the pressure measuring unit is electrically connected to the first power supply path for power supply purposes; and a pressure-sensitive mechanical switching unit is arranged within the battery housing and is electrically connected, in series with the pressure measuring unit, to the first power supply path via two electrical terminals, wherein:

the pressure-sensitive mechanical switching unit switches to an electrically conductive switching state when the pressure within the battery housing exceeds a predefined pressure threshold establishing a supply of power to the pressure measuring unit via the first power supply path, and the pressure-sensitive mechanical switching unit switches to an electrically blocking switching state when the pressure within the battery housing falls below the pressure threshold interrupting the supply of power to the pressure measuring unit via the first power supply path.

\* \* \* \* \*